(12) United States Patent
Miller et al.

(10) Patent No.: US 11,871,875 B2
(45) Date of Patent: Jan. 16, 2024

(54) COLLAPSIBLE HANDLE FOR COOKWARE LIDS

(71) Applicant: SharkNinja Operating LLC, Needham, MA (US)

(72) Inventors: Eric Arthur Miller, Somerville, MA (US); Nathaniel R. Lavins, Cambridge, MA (US); Joshua D. Anthony, Billerica, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/468,829

(22) Filed: Sep. 8, 2021

(65) Prior Publication Data

US 2023/0072062 A1 Mar. 9, 2023

(51) Int. Cl.
A47J 45/06 (2006.01)
A47J 36/06 (2006.01)

(52) U.S. Cl.
CPC .............. *A47J 45/063* (2013.01); *A47J 36/06* (2013.01)

(58) Field of Classification Search
CPC ........ A47J 45/063; A47J 36/06; A47J 45/074; B65D 23/10; B65D 23/104
See application file for complete search history.

(56) References Cited

U.S. PATENT DOCUMENTS

| | | | |
|---|---|---|---|
| 1,717,538 A * | 6/1929 | Anderson | A47J 45/063 215/305 |
| D426,107 S | 6/2000 | Cheng | |
| D439,108 S | 3/2001 | Logiudice | |
| D444,347 S | 7/2001 | Logiudice | |
| D491,016 S | 6/2004 | Rae | |
| D518,331 S | 4/2006 | Rae | |
| 7,051,550 B2 | 5/2006 | Roth et al. | |
| D555,421 S | 11/2007 | Thurlow et al. | |
| D555,424 S | 11/2007 | Rae | |
| D555,425 S | 11/2007 | Rae | |
| D555,971 S | 11/2007 | Rae | |
| D555,972 S | 11/2007 | Rae | |
| D560,428 S | 1/2008 | Prakasa | |
| D560,429 S | 1/2008 | Prakasa | |
| D569,682 S | 5/2008 | Prakasa | |
| D575,982 S | 9/2008 | Rae | |
| D589,744 S | 4/2009 | Rae | |
| D593,794 S | 6/2009 | Rae | |
| D596,895 S | 7/2009 | Tetreault et al. | |
| D596,897 S | 7/2009 | Tetreault et al. | |

(Continued)

FOREIGN PATENT DOCUMENTS

| | | |
|---|---|---|
| CN | 202775832 U | 3/2013 |
| CN | 203122094 U | 8/2013 |

(Continued)

*Primary Examiner* — Don M Anderson
(74) *Attorney, Agent, or Firm* — Mintz Levin Cohn Ferris Glovsky and Popeo, P.C.

(57) ABSTRACT

Cookware lids are provided having a collapsible handle that is movable between a first extended configuration for use during cooking, and a second collapsed configuration with a reduced profile to enable the lids to be stored. In certain exemplary embodiments, the lids can include attachment features to allow the lids to be arranged in a stacked configuration, with the collapsible handle mated to the attachment feature on an adjacent lid.

13 Claims, 10 Drawing Sheets

(56) References Cited

U.S. PATENT DOCUMENTS

| | | | |
|---|---|---|---|
| D596,898 S | 7/2009 | Tetreault et al. | |
| D598,704 S | 8/2009 | Tetreault et al. | |
| D599,165 S | 9/2009 | Rae | |
| D617,607 S | 6/2010 | Pantaleo | |
| D622,098 S | 8/2010 | Pantaleo | |
| D630,470 S | 1/2011 | McEldowney | |
| D653,078 S | 1/2012 | Cheng et al. | |
| 8,123,067 B2 | 2/2012 | Thomson | |
| D658,002 S | 4/2012 | Rae | |
| D658,004 S | 4/2012 | Rae | |
| D667,689 S | 9/2012 | Rae | |
| D667,690 S | 9/2012 | Rae | |
| D667,691 S | 9/2012 | Rae | |
| 8,272,531 B2 | 9/2012 | Cuillery et al. | |
| 8,322,564 B2 | 12/2012 | Magnouloux | |
| D682,013 S | 5/2013 | Huang | |
| D682,023 S | 5/2013 | Rae | |
| 8,544,679 B2 | 10/2013 | Cuillery | |
| D704,998 S | 5/2014 | Rae | |
| D705,001 S | 5/2014 | Rae | |
| D713,678 S | 9/2014 | Rae | |
| D713,681 S | 9/2014 | Rae | |
| D729,570 S | 5/2015 | Barberi | |
| D746,102 S | 12/2015 | Zucchi | |
| D746,103 S | 12/2015 | Zucchi | |
| D749,356 S | 2/2016 | Steiner | |
| D757,488 S | 5/2016 | McConnell et al. | |
| D763,618 S | 8/2016 | Feng et al. | |
| D795,010 S | 8/2017 | Barberi | |
| 9,737,169 B2 | 8/2017 | Denny | |
| D798,655 S | 10/2017 | Barberi | |
| D809,337 S | 2/2018 | Chen | |
| D813,596 S | 3/2018 | Zucchi | |
| 9,970,589 B2 | 5/2018 | Hobbs et al. | |
| 10,106,296 B2 | 10/2018 | Lepinske et al. | |
| D852,576 S | 7/2019 | Jamison et al. | |
| 10,351,299 B2 | 7/2019 | Jacobson | |
| D862,978 S | 10/2019 | Hollinger | |
| 10,463,116 B2 | 11/2019 | Barnett et al. | |
| 10,486,857 B2 | 11/2019 | Gossens et al. | |
| 10,655,775 B2 | 5/2020 | Hobbs et al. | |
| 10,687,671 B2 | 6/2020 | Lee | |
| 10,742,251 B2 | 8/2020 | Barnett et al. | |
| 11,053,062 B2 | 7/2021 | Parsons | |
| 11,071,405 B2 | 7/2021 | Hollinger | |
| 2006/0037872 A1* | 2/2006 | Steiner | A47J 43/0727 73/426 |
| 2010/0230319 A1* | 9/2010 | Thomson | A47J 36/06 220/573.1 |
| 2013/0075397 A1* | 3/2013 | Glanz | A47J 36/06 220/212.5 |
| 2014/0319136 A1* | 10/2014 | Bochenek | A47J 45/074 220/212.5 |
| 2015/0024104 A1* | 1/2015 | Denny | A47J 36/06 426/523 |
| 2017/0188740 A1* | 7/2017 | Shicheng | A47J 27/002 |
| 2019/0055062 A1* | 2/2019 | Winn | H04B 1/3888 |
| 2019/0208871 A1* | 7/2019 | Barnett | A45F 5/02 |
| 2020/0095018 A1* | 3/2020 | Truong | B65D 21/0217 |
| 2020/0268198 A1* | 8/2020 | Kim | A47J 45/063 |
| 2022/0015571 A1* | 1/2022 | Yalkut-Lubomirski | A47J 36/06 |

FOREIGN PATENT DOCUMENTS

| | | | |
|---|---|---|---|
| CN | 204049243 U | 12/2014 | |
| CN | 204049246 U | 12/2014 | |
| CN | 204862595 U | 12/2015 | |
| CN | 103054489 B | 3/2017 | |
| CN | 108552943 A | 9/2018 | |
| CN | 208551137 U | 3/2019 | |
| CN | 209235728 U | 8/2019 | |
| CN | 209331723 U | 9/2019 | |
| CN | 209450325 U | 10/2019 | |
| CN | 209846879 U | 12/2019 | |
| CN | 210018905 U | 2/2020 | |
| CN | 105030052 B | 5/2020 | |
| CN | 210870989 U | 6/2020 | |
| CN | 211533909 U | 9/2020 | |
| CN | 211559713 U | 9/2020 | |
| CN | 212415449 U | 1/2021 | |
| CN | 212415450 U | 1/2021 | |
| CN | 212939381 U | 4/2021 | |
| CN | 213129094 U | 5/2021 | |
| CN | 213248297 U | 5/2021 | |
| CN | 113044358 A | 6/2021 | |
| CN | 213488336 U | 6/2021 | |
| CN | 213588013 U | 7/2021 | |
| CN | 214017196 U | 8/2021 | |
| CN | 214484233 U | 10/2021 | |
| DE | 102011000452 A1 * | 8/2012 | A47J 27/002 |
| DE | 202014000455 U1 | 3/2014 | |
| EM | 0000594310001 S | 2/2003 | |
| EM | 0000020190001 S | 4/2003 | |
| EM | 0002068670001 S | 7/2004 | |
| EM | 0007421350004 S | 7/2007 | |
| EM | 0008718010007 S | 3/2008 | |
| EM | 0010715420002 S | 3/2009 | |
| EM | 0016100980001 S | 10/2009 | |
| EM | 0017113590004 S | 8/2010 | |
| EM | 0019055220001 S | 8/2011 | |
| EM | 0021010710002 S | 11/2012 | |
| EM | 0022863770002 S | 8/2013 | |
| EM | 0023087830001 S | 9/2013 | |
| EM | 0024761270002 S | 6/2014 | |
| EM | 0025406820001 S | 9/2014 | |
| EM | 0025719010001 S | 2/2015 | |
| EM | 0026240640007 S | 5/2015 | |
| EM | 0025644350002 S | 6/2015 | |
| EM | 0029946320001 S | 3/2016 | |
| EM | 0034752010001 S | 11/2016 | |
| EP | 1559354 B1 | 6/2007 | |
| EP | 3351152 B1 | 5/2019 | |

\* cited by examiner

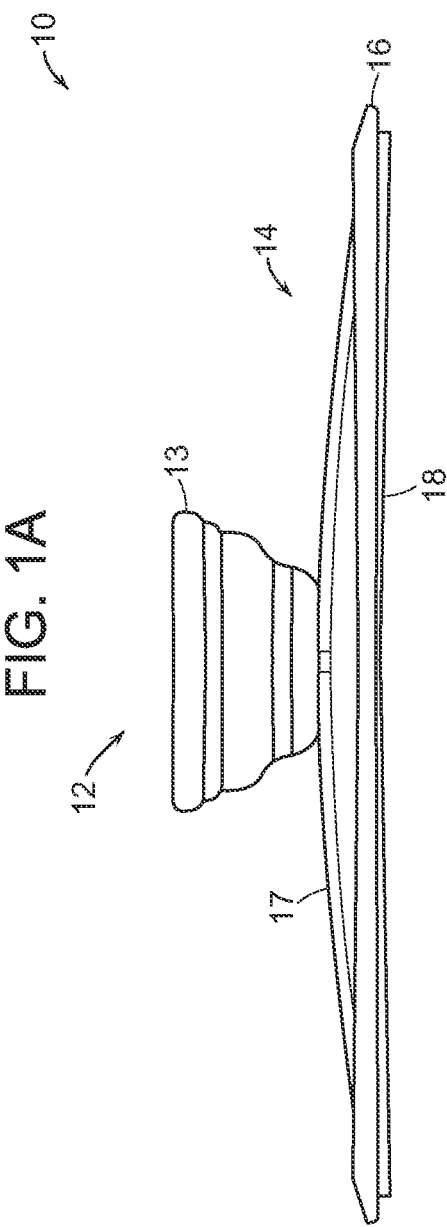
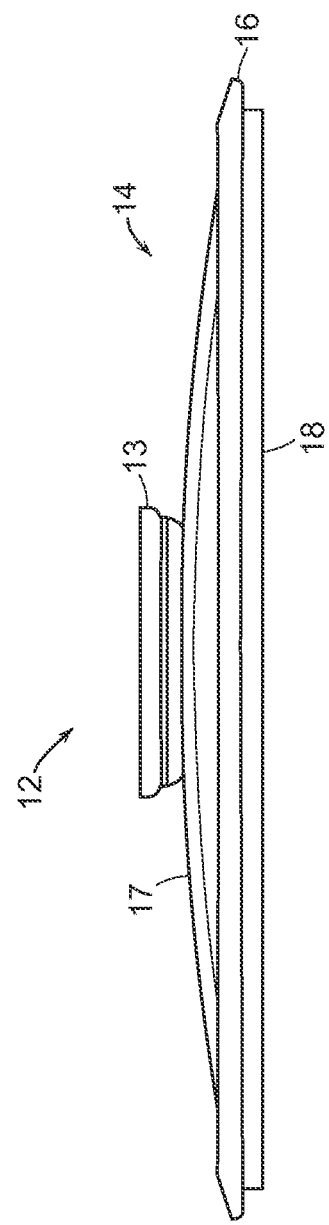

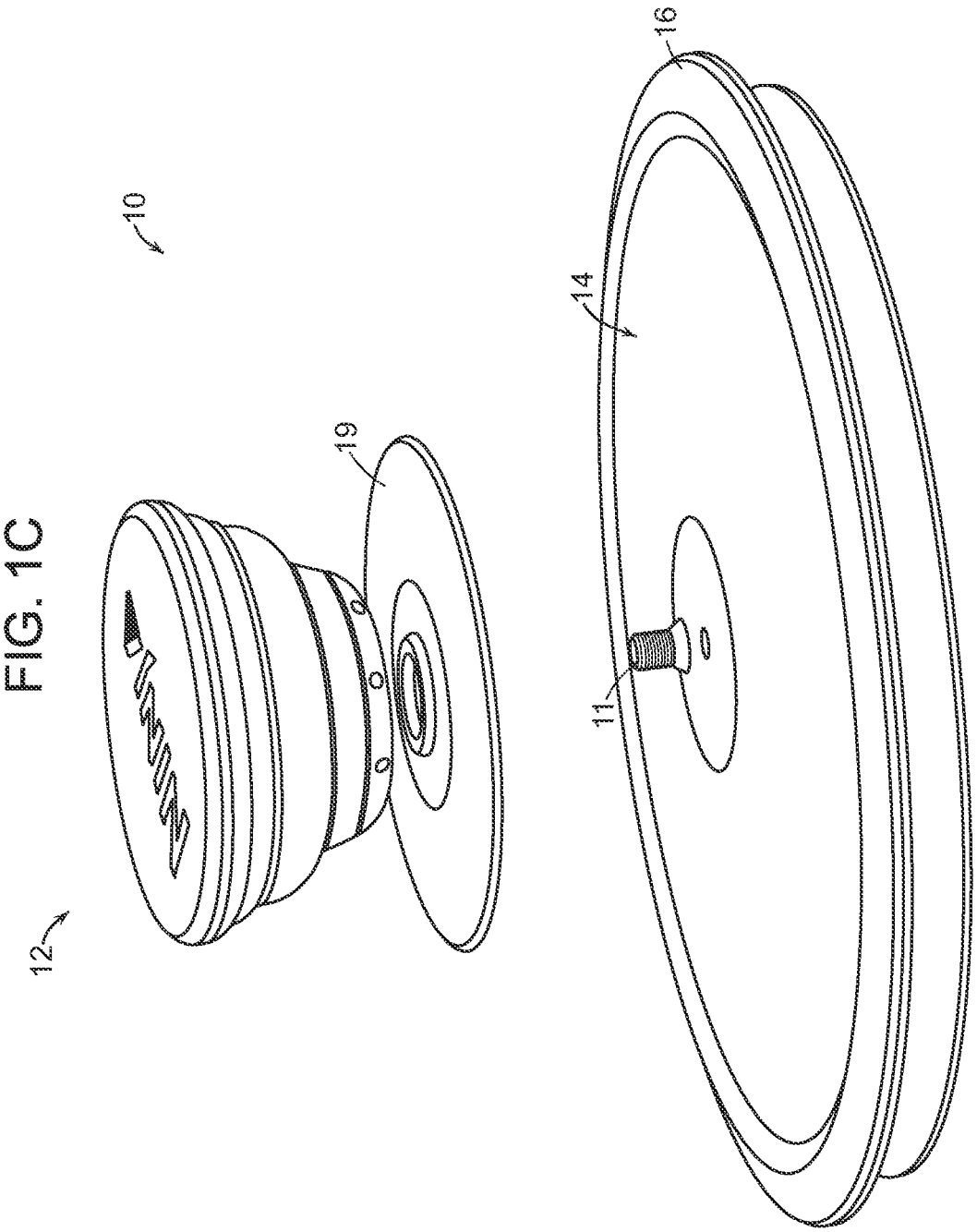

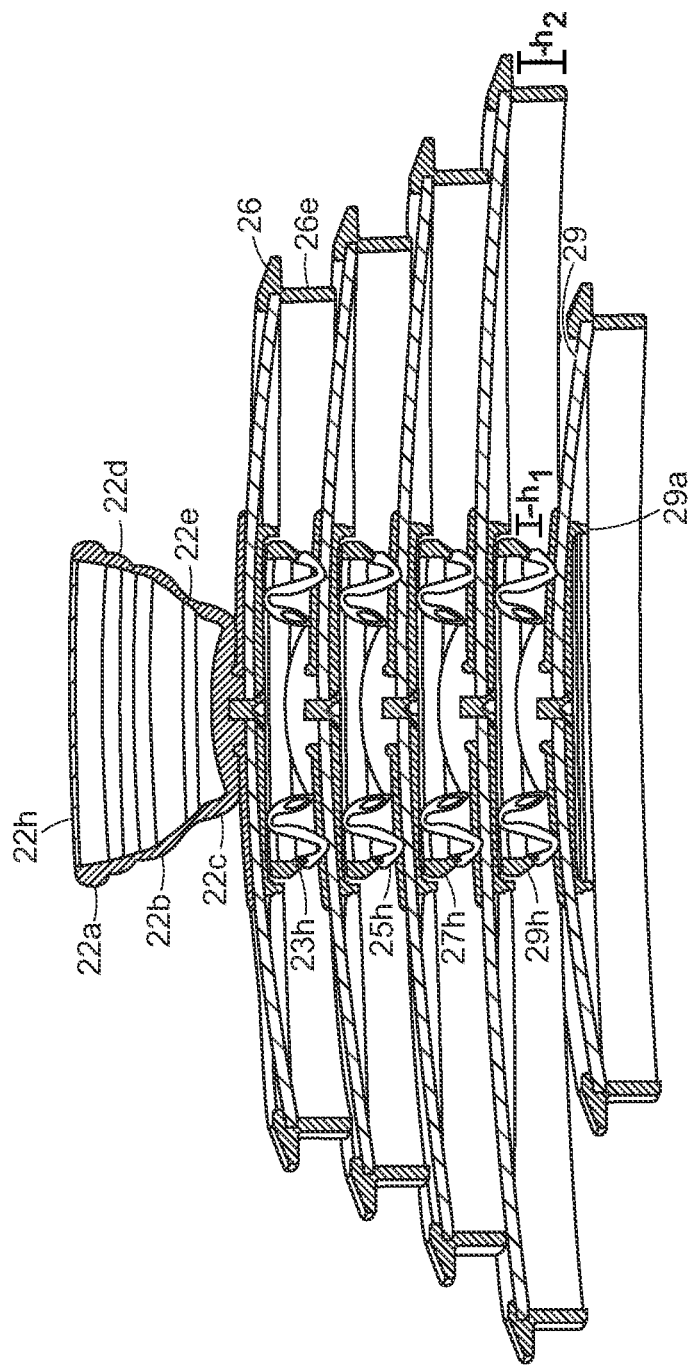

COLLAPSIBLE HANDLE FOR COOKWARE LIDS

FIELD OF THE INVENTION

The present invention relates to a collapsible handle for cookware lids.

BACKGROUND OF THE INVENTION

Conventional cookware, such as pots and pans, typically include a body formed of metal defining a cooking chamber for receiving foodstuff. A handle is attached to the body for allowing a user to move the cookware. Additionally, conventional cookware may include a lid for covering the body both during and after cooking. The lid typically includes a raised handle for grasping. While in use, the raised lid handle is necessary to prevent a user from getting burned. However, when the cookware is not in use, typical lid handles make storing of the lids difficult. Typical lid handles are often too tall to allow for stacking of the lids in a convenient arrangement for storage. Accordingly, a need exists for a cookware lid that can be easily gripped during use, but that allows for space saving and ease of storage.

SUMMARY OF THE INVENTION

Cookware lids are provided for covering a container. In one embodiment, an apparatus for covering a container is provided and includes a lid having a top surface and a bottom surface. A handle can be fixedly attached to the lid and is movable between a first configuration and a second configuration. In the first configuration a top portion of the handle is spaced from the top surface, and in the second configuration the top portion is adjacent the top surface.

In one embodiment, the apparatus can include a first attachment feature on the handle. The first attachment feature can be exposed when the handle is in the second collapsed configuration. The apparatus can also include a second attachment feature on the bottom surface of the lid. In certain embodiments, the first and second attachment features can be in the form of a recess, a groove, a hole, a channel, a coating, a protrusion, or a raised portion.

In other aspects, the handle can be flexible and it can be configured to deform when moved between the first and second configurations. The handle can include at least one recess that is exposed when the handle is in the second configuration. In other embodiments, the apparatus can include at least one protrusion on the bottom surface of the lid. The at least one protrusion can have a shape that is complementary to a shape of the at least one recess.

In yet another embodiment, a cooking system is provided and includes a first lid having a first handle on a top surface thereon. The first handle can be movable between a first configuration and a second configuration. The first lid can further include a first attachment feature. The cooking system can further include a second lid having a second handle on a top surface thereon. The second handle can be movable between a first configuration and a second configuration. The second lid can further include a second attachment feature. The first attachment feature can be configured to abut the second attachment feature when the second handle is in the second configuration to allow the first lid to be stacked on top of the second lid.

In certain aspects, the first attachment feature can be on a bottom surface of the first lid, and the second attachment feature can be positioned on the second handle of the second lid. The first attachment feature can include a protrusion on the bottom surface of the first lid. The first attachment feature can be configured to receive the second attachment feature therein, or the second attachment feature can be configured to receive the first attachment feature therein. In other aspects, the first and second handles can each have a height in the first configuration that is greater than a height in the second configuration.

In yet another embodiment, a lid is provided and includes a body having a top surface, a bottom surface, and an outer periphery. A rim can extend around the outer periphery. The rim can include an edge extending below the bottom surface. The lid can also include a handle movable between a first configuration having a height greater than a height of the edge, and a second configuration having a height equal to or less than the height of the edge.

In certain aspects, the lid can include a first attachment feature that is exposed when the handle is in the second configuration. In certain embodiments, the first attachment feature can be in the form of a magnet, a recess, a groove, a hole, a channel, a coating, or a raised portion. In other embodiments, the first attachment feature can be formed from a portion of the handle in the second configuration.

The lid can also include a second attachment feature on a bottom surface of the lid. In certain embodiments, the second attachment feature can be in the form of a magnet, a recess, a groove, a hole, a channel, a coating, or a raised portion.

BRIEF DESCRIPTION OF THE DRAWINGS

The invention will be more fully understood from the following detailed description taken in conjunction with the accompanying drawings, in which:

FIG. 1A is a side view of one embodiment of a cookware lid having a handle shown in a first extended configuration for use;

FIG. 1B is a side view of the cookware lid of FIG. 1A with the handle in a second collapsed configuration for storage;

FIG. 1C is an exploded perspective view of the cookware lid of FIG. 1A;

FIG. 2B is a cross-sectional view taken along line A-A of FIG. 2A of the plurality of cookware lids;

DETAILED DESCRIPTION

Figure 2A:
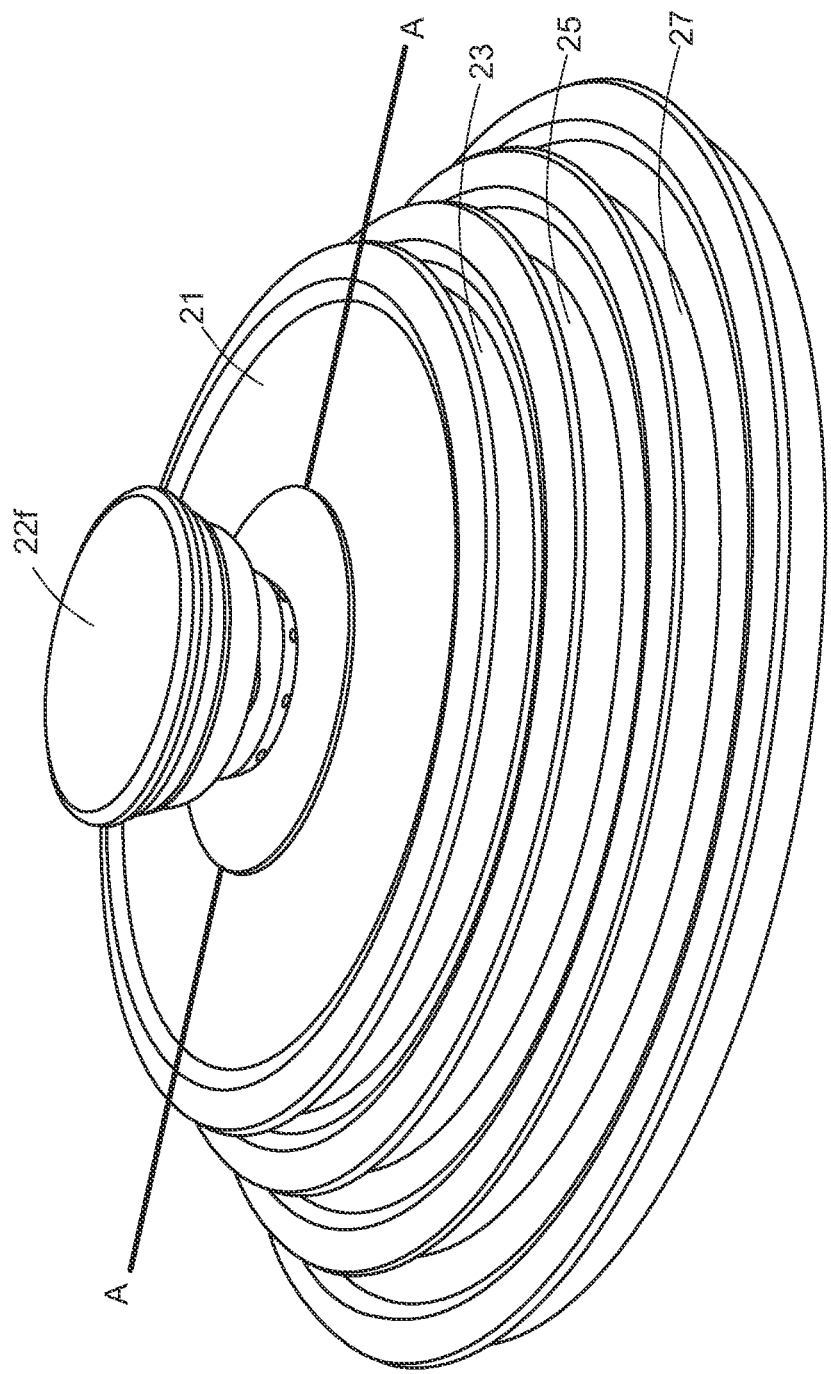
FIG. 2A is a perspective top view of a plurality of cookware lids having a configuration similar to the lid of FIG. 1A, shown in varying sizes and in a stacked configuration.

Certain exemplary embodiments will now be described to provide an overall understanding of the principles of the structure, function, manufacture, and use of the devices and methods disclosed herein. One or more examples of these embodiments are illustrated in the accompanying drawings. Those of skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

A cookware lid is provided having a collapsible handle that is movable between a first extended configuration and a second collapsed configuration. The first extended configuration allows for the cookware lid to be easily grasped by a user. The second collapsed configuration has a smaller profile which saves space and facilitates storage. In the second collapsed configuration, the lid can be stacked with other lids. In certain embodiment, the second collapsed configuration can allow multiple lids to have a nested configuration in which the lids remain substantially stationary and do not move or slide relative to one another.

FIGS. 1A-1C illustrate one embodiment of a cookware lid assembly or cover 10 that includes a lid 14 and a collapsible cookware handle 12. FIG. 1A shows the collapsible cookware handle 12 in a first extended configuration, and FIG. 1B shows the handle 12 in a second collapsed configuration. In general, the cookware lid 14 has an upper or top surface 17, a bottom surface 18, and a rim 16 surrounding a periphery of the lid 14. The lid 14 can be circular, oval, square, or any desired shape and may be formed of any suitable material such as metal, ceramic, glass, or a heat-resistant polymeric material. The rim 16 can be formed of the same material as the lid 14, or of a different material. For example, lid 14 can be formed of a transparent glass while the rim 16 can be formed of stainless steel. The rim 14 can provide reinforcement to the lid 14, and can also create a shape that fits within or surrounds the top edge of a pot, pan, or other cookware. Some embodiments may not include a rim 16 as an individual component. Rather, the lid 14 can be shaped to have an integral rim which mates with a corresponding edge of the cookware.

The collapsible cookware handle 12 can also have a variety of configurations, and can be formed of any material that allows for movement between a first and second configuration, while also allowing the handle to be easily grasped by a user. In an exemplary embodiment, the collapsible cookware handle 12 has a conical shape with a diameter that increases radially outward from a bottom of the handle 12 adjacent to the lid 14 to the top outer-most end of the handle 12. The diameter can be consistent, or can vary with stepped features as shown in FIG. 1A. In some embodiments, the diameter may be smaller at a top portion and increase towards the bottom of the handle. As illustrated, the top surface of the handle 12 can be solid, however in other embodiments the top surface of the handle 12 can be open such that the handle is hollow.

The handle 12 can be formed from various materials, but preferably is formed from a heat-resistant material. In some embodiments, the collapsible cookware handle 12 can be formed from a polymeric material, such a silicone to allow the handle to flex and deform as it moves between the first and second configurations. The collapsible cookware handle 12 can be positioned on the top surface 17 and can be mounted to the lid 14 using various mating techniques, discussed further below. In the embodiment illustrated in FIGS. 1A-1C, the collapsible cookware handle 12 is shown affixed in a central location on the top surface 17. However, in other embodiments, the collapsible cookware handle 12 can be positioned at a location offset from a central location of the top surface 17.

In the first configuration illustrated in FIG. 1A, a top portion 13 of the handle 12 is shown spaced from the top surface 17. This allows a user to easily grasp the handle 12 in order to move the lid 14 to a desired location. The collapsible cookware handle 12 can remain in the first extended configuration while in use, such as during cooking and while cleaning lid 14. When finished, the handle 12 can be moved to the second collapsed configuration as shown in FIG. 1B. In the second configuration, the top portion 13 of the handle 12 is positioned adjacent or near the top surface 17, such that a height of the handle 12 is significantly reduced. This allows for the lid 14 to have a space saving smaller profile. The collapsible cookware handle 12 can be moved from the first configuration to the second configuration by pressing the handle 12 towards the top surface 17. The handle 12 can be moved from the second collapsed configuration to the first extended configuration by the gripping handle 12 and pulling the handle 12 away from the top surface 17 of the lid 14. The collapsible cookware handle 12 can be formed such that it is biased to either the first or second configuration. In certain embodiments, the collapsible cookware handle 12 can include a locking feature that prevents the handle 12 from moving from either the first or second configuration. The locking feature can be depressed, rotated, or otherwise unlocked by a user to allow for movement between the first and second configurations.

FIG. 1C illustrates an exploded view of the cookware cover 10 of FIGS. 1A and 1B. As indicated above, the collapsible cookware handle 12 can be connected to the lid 14 using various mating techniques. As shown in FIG. 1C, a fastener 11, such as a screw, bolt, or any other fastener, can be provided to join the components together. The fastener 11 may pass up through the bottom of the lid 14, then through a heat guard 19, and can enter the bottom of collapsible cookware handle 12 to mate therewith, thus securing the handle 12 to the lid 14. The heat guard 19 can be provided to minimize heat transfer from a cooking chamber covered by the lid 14 in order to prevent the temperature of collapsible cookware handle 12 from rising significantly. Although the heat guard 19 is shown in this embodiment as being fixed and solid, other embodiments may include moveable heat guards and vent holes to allow steam to escape the confines of the cooking chamber. While FIG. 1C illustrates the handle 12, lid 14, fastener 11, and heat guard 19 as individual components, it is understood that one or more of the illustrated elements could be made integral with each other.

Figure 2C:
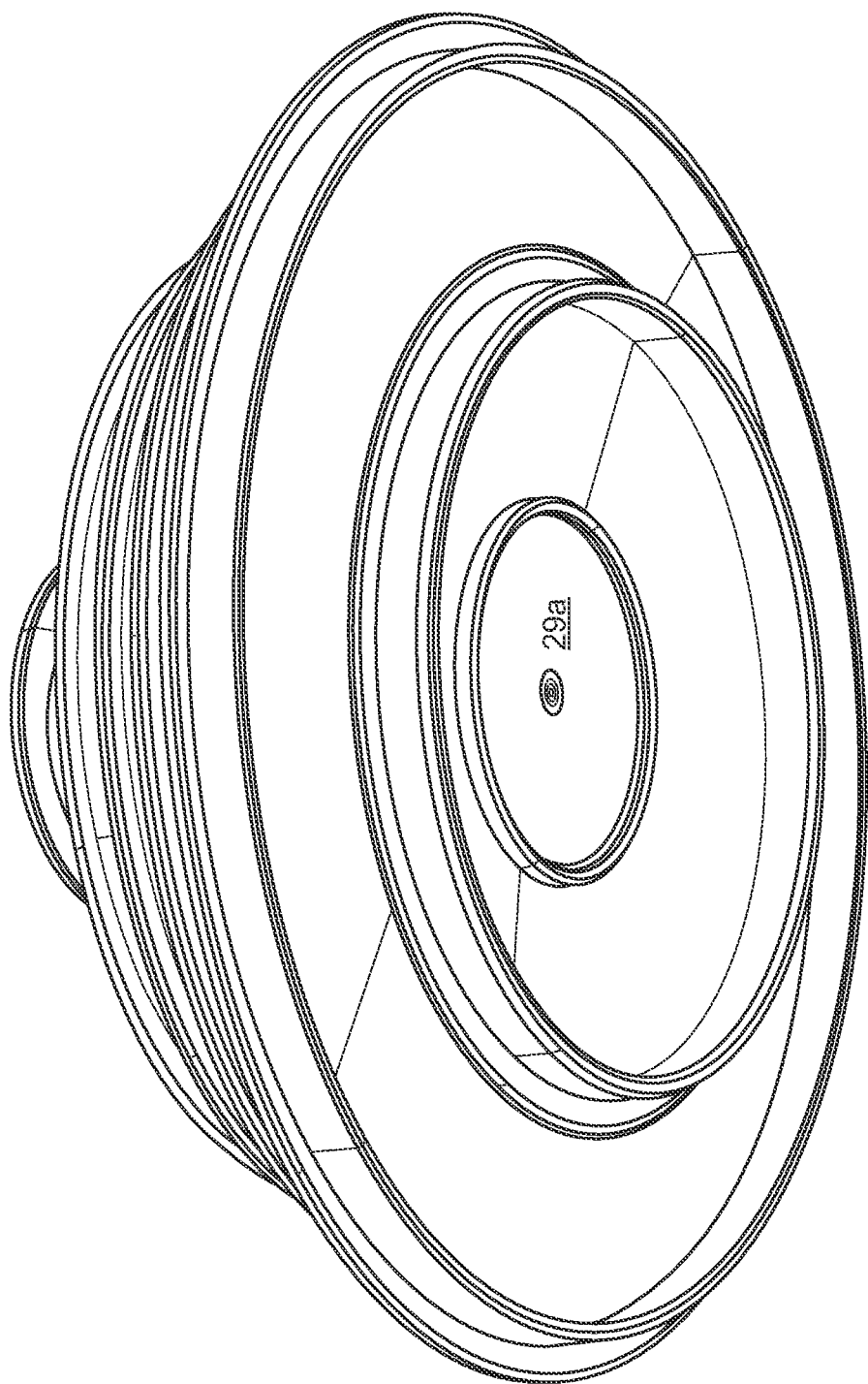
FIG. 2C is a perspective bottom view of the underside of the plurality of cookware lids of FIG. 2A.

FIGS. 2A-2C illustrate multiple cookware lids 21, 23, 25, 27, 29 shown in a stacked configuration. Each lid 21, 23, 25, 27, 29 has a configuration similar to lid 14 shown in FIGS. 1A-1C. As shown, the collapsible handle 22h of lid 21 is in the first extended configuration while the handles 23h, 25h, 27h, 29h of lids 23, 25, 27, 29 are in the second collapsed configuration to allow for stacking. It is understood that the collapsible handle 22h of lid 21 could also be in the collapsed configuration, but is shown in the extended configuration for illustrative purposes. Each lid 21, 23, 25, 27, 29 includes a rim 26 having an edge 26e that extends below the bottom surface of lid 21, 23, 25, 27, 29. In the second collapsed configuration, the handles 22h, 23h, 25h, 27h, 29h can each have a height $h_1$ that is less than or equal to the height $h_2$ of the edge.

As illustrated in FIGS. 2A-2C, the lids 21, 23, 25, 27, 29 are nested so as to prevent relative movement between the lids. This can be accomplished by a first attachment feature associated with the handle 21h, 23h, 25h, 27h, 29h abutting a second attachment feature associated with the bottom surface of an adjacent lid 21, 23, 25, 27, 29. The first attachment feature can be exposed when the handle 21h, 23h, 25h, 27h, 29h is in the second collapsed configuration. In this embodiment, the outer perimeter of a top portion of the collapsible handle 21h, 23h, 25h, 27h, 29h can form the first attachment feature, and the second attachment feature can be in the form of a recess 21a, 23a, 25a, 27a, 29a in the bottom surface of lid 21, 23, 25, 27, 29 that is configured to receive the outer perimeter of the top portion of the collapsible handle 21h, 23h, 25h, 27h, 29h. As shown in FIG. 2C, the recess 29a can be integral with the lid 29 and can be defined by a protrusion having a shape, e.g., circular, configured to match a shape of the top surface of the handle. However, in other embodiments, the recess 29a can be formed by a separate component attachable to the lid 29. The outer perimeter of the top portion of collapsible handle 21h, 23h, 25h, 27h, 29h and/or the recess 21a, 23a, 25a, 29a can include a coating, texture, or other feature to increase friction between the first attachment feature and the second attachment feature.

As illustrated in FIG. 2B, the collapsible handle can include a plurality of rigid members 22a, 22b, 22c separated by a plurality of flexible members 22d, 22e. The height of the handle 22 in the collapse configuration may be defined by a height of one or more of the rigid members 22a, 22b, 22c. The rigid members 22a, 22b, 22c and the flexible members 22d, 22e can be configured to create an undulating structure as shown by handles 23h, 25h, 27h, and 29h in FIG. 2B in the second collapsed configuration. More or less rigid and flexible members, and rigid members of various shapes, may be used to create a desired shape in the collapsed configuration.

Figure 3A:
FIG. 3A is a side schematic view showing an embodiment of a collapsible handle for use with a cookware lid, with the handle shown in a second collapsed configuration.
Figure 3B:
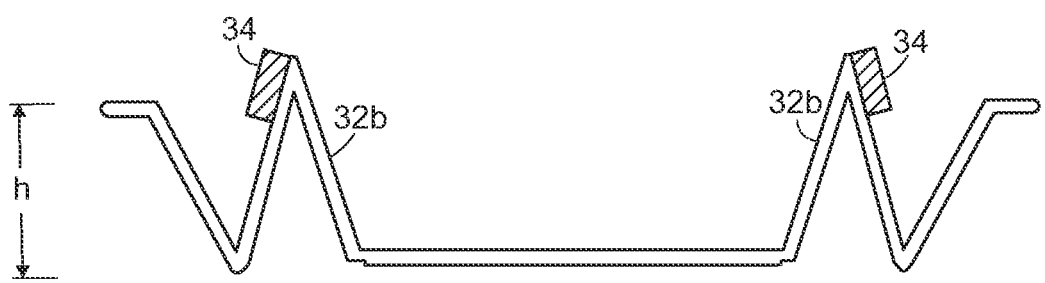
FIG. 3B is a side schematic view showing another embodiment of a collapsible handle for use with a cookware lid, with the handle shown in a second collapsed configuration.
Figure 3C:
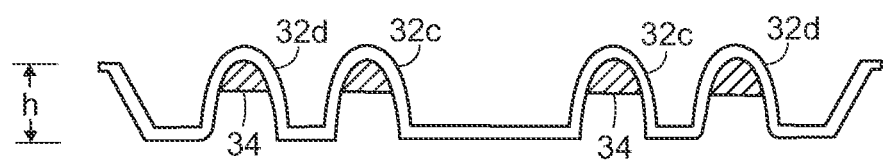
FIG. 3C is a side schematic view illustration showing yet another embodiment of a collapsible handle for use with a cookware lid, with the handle shown in a second collapsed configuration.

A variety of other features can be used to facilitate mating of a handle to an adjacent lid. For example, the top surface of the handle can include at least one recess, groove, hole, channel, coating, protrusion, raised portion or other feature to act as the first attachment mechanism. FIGS. 3A-3C illustrate various embodiments of attachment features. In the embodiment shown in FIG. 3A, the rigid and flexible members are configured to create a protrusion 32a when in the second collapsed configuration. Protrusion 32a can have a height that is less than the height h of the outer portion of handle. In this embodiment, the collapsible handle includes an open top and the protrusion 32a acts as the first attachment member. The protrusion 32a can form a raised ring, or partial ring, that mates with a corresponding ring-shaped recess having a complimentary shape on the bottom surface of an adjacent lid. Alternatively, the outer portion of handle may form a portion of the first attachment member.

In FIG. 3B, the rigid and flexible members are likewise configured to create a protrusion 32b when in the second collapsed configuration. In this embodiment, the protrusion 32b has a height that is greater than the height h of the outer portion of handle. In this embodiment, the collapsible handle also includes an open top and the protrusion 32b can act as the first attachment member. The protrusion 32b can form a raised ring, or partial ring, that mates with a corresponding ring-shaped recess having a complimentary shape on the bottom surface of an adjacent lid.

FIG. 3C shows another embodiment where the rigid and flexible members are configured to create an inner ring or partial ring-shaped protrusions 32c and an outer ring or partial ring-shaped protrusion 32d. The protrusions 32c, 32d can each have a height that is substantially similar to a height h of outer portion of the handle. The protrusions 32c, 32d can act as the first attachment member that mates with a corresponding ring-shaped recess having a complimentary shape on the bottom surface of an adjacent lid.

In other embodiments, friction enhancing coatings or features 34 can be applied to any portion of the protrusions 32a, 32b, 32c, 32d to increase the strength of connection to the second attachment members. Coatings or features 34 may include adhesives, a material different than the protrusions 32a, 32b, 32c, 32d, or surface modifications such as abrasions or other features to increase friction on the surface of protrusions 32a, 32b, 32c, 32d. The collapsible handles can have any desired shape. While handles having a circular or ring shape are discussed, it is understood that handles may include square, rectangular, oval, or irregular shapes as well.

Figure 4A:
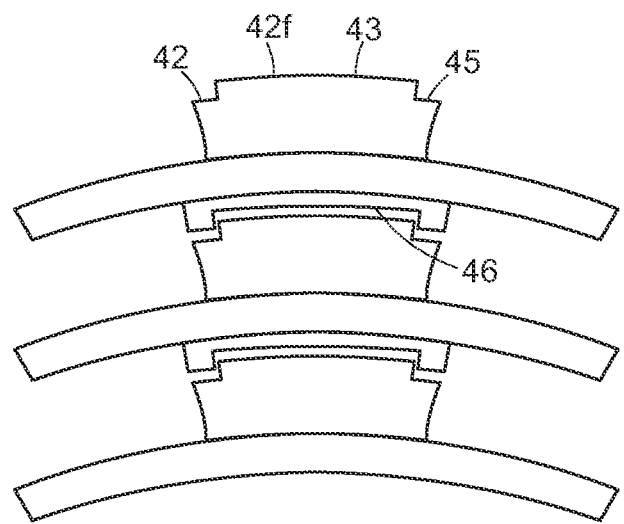
FIG. 4A is a side schematic view of another embodiment of a plurality of cookware lids, each having a handle with an attachment feature mated to an attachment feature on an adjacent cookware lid.

FIG. 4A illustrates a cross-section of another embodiment where the top surface 42f of the handle 42 includes a raised central portion 43 that is surrounded by a lower outer periphery 45. The raised central portion 43 acts as the first attachment member and mates with a corresponding recess 46 having a complimentary shape on the bottom surface of an adjacent lid. The raised central portion 43 can be a permanent fixture in the top surface 42f regardless of the configuration of the handle, or it can pop out as the handle 42 transforms from the first configuration to the second configuration. For example, the top surface 42f can be formed of a flexible material that changes shape as it moves downward.

Figure 4B:
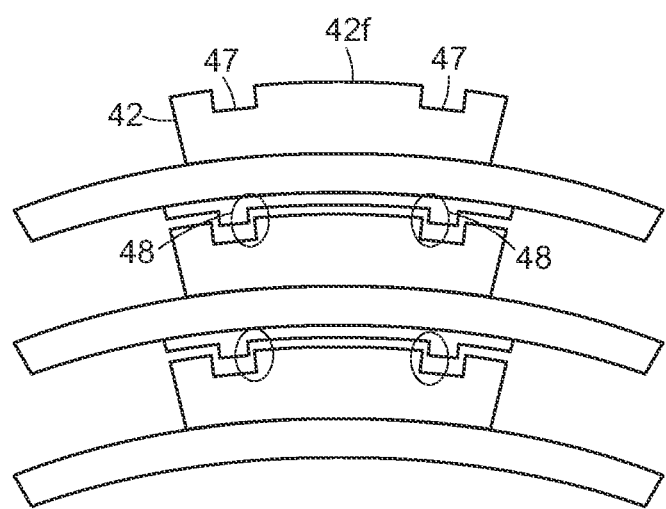
FIG. 4B is a side schematic view of yet another embodiment of a plurality of cookware lids, each having a handle with an attachment feature mated to an attachment feature on an adjacent cookware lid.

FIG. 4B illustrates a cross-section of another embodiment of an attachment mechanism in which the top surface of the collapsible handle 42 includes a recess, trough, groove, or channel 47 extending therearound. The at least one recess, trough, groove, or channel 47 may act as the first attachment member and mate with a corresponding raised portion 48 on the bottom surface of an adjacent lid. The at least one recess, trough, groove, or channel 47 may be a permanent fixture in top surface 42f or can be formed or otherwise be exposed as the handle 42 transforms from the first configuration to the second configuration. The at least one recess, trough, groove, or channel 47 can have any desired shape configured to mate with a corresponding raised portion 48 on the bottom surface of lid.

Figure 5A:
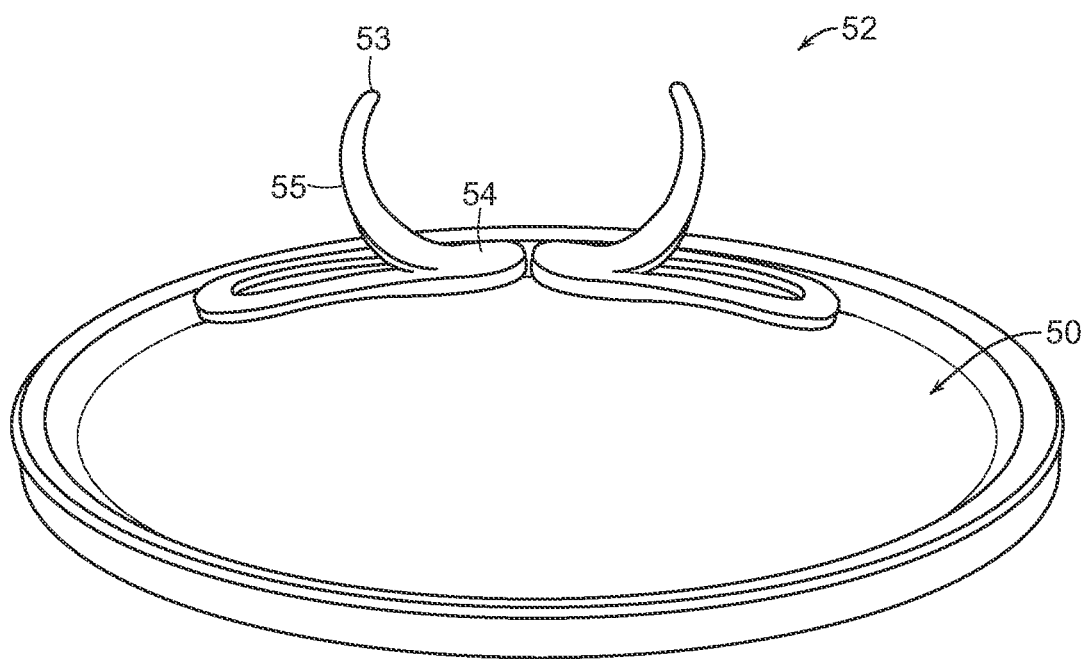
FIG. 5A is a perspective top view of another embodiment of a cookware lid having a handle that is movable between first and second configurations, with the handle shown in a first extended configuration.
Figure 5B:
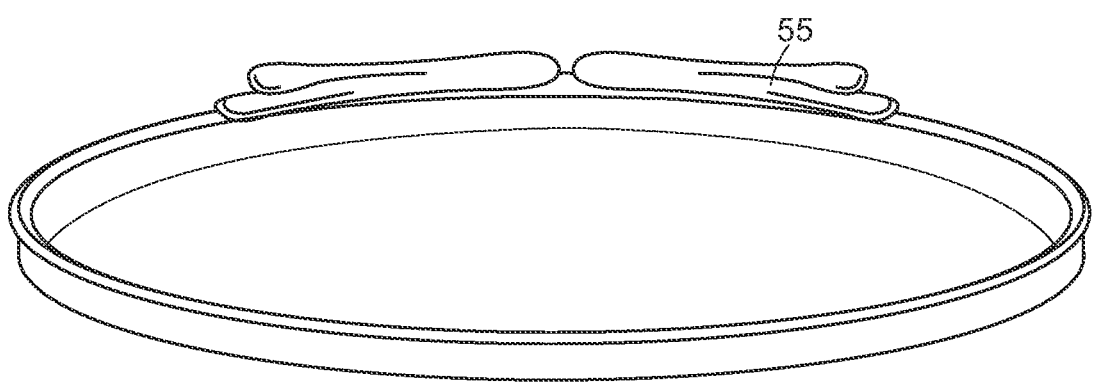
FIG. 5B is a perspective view of the cookware lid of FIG. 5A showing the handle in the second collapsed configuration.

FIGS. 5A and 5B illustrate another embodiment of a cookware lid assembly or cover that includes cookware lid 50 having a collapsible handle 52 that is movable between first and second configurations. As shown in FIG. 5A, handle 52 is in the form of an elongate body 55 affixed to an upper surface of lid 50 at a central portion thereof and having a free first end 53 and a free second end 54. The handle 52 is curved from the first end 53 to the second end 54 in the first extended configuration. In the second configuration, shown in FIG. 5B, the elongate body 55 rests against the upper surface of the lid 50 for storage.

Figure 6A:
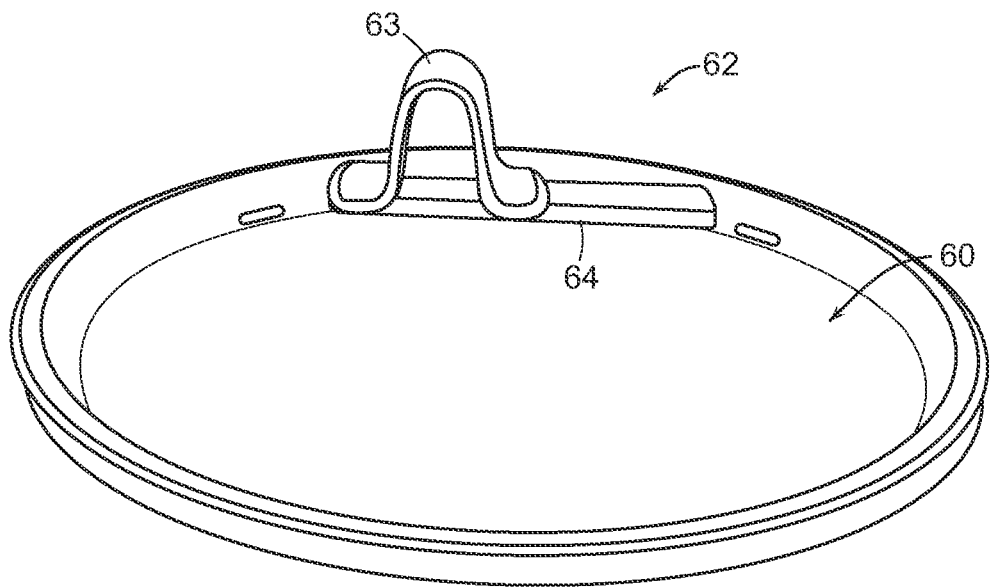
FIG. 6A is a perspective view of yet another embodiment of a cookware lid having a handle that is movable between first and second configurations, with the handle shown in the first extended configuration.
Figure 6B:
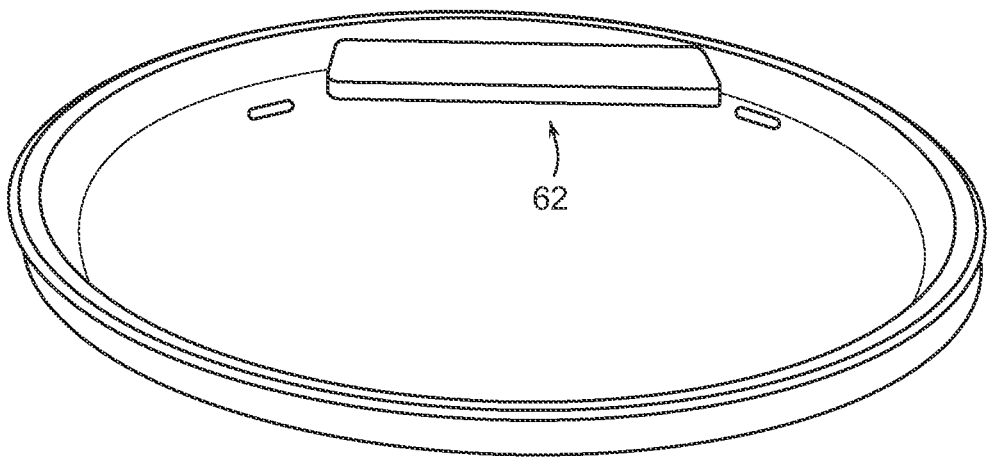
FIG. 6B is a perspective view of the cookware lid of FIG. 6A, showing the handle in the second collapsed configuration.

FIGS. 6A-6B is a perspective view of yet another embodiment of a cookware lid 60 having a handle 62 that is movable between first and second configurations. As shown in FIG. 6A, which illustrates the handle in the first extended position, the handle 62 includes a guide body 64 affixed to the upper surface of lid 60 and having an opening extending therethrough. The handle 62 also includes a second movable body 63 attached at one end to the lid and having a free end that slides through the guide body 64 to move from the first configuration shown in FIG. 6A to the second configuration shown in 6B.

Figure 7A:
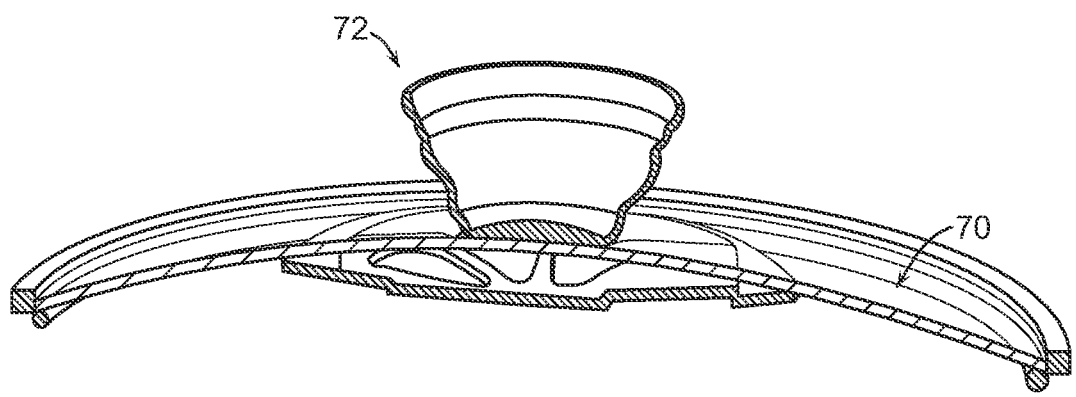
FIG. 7A is a cross-sectional side view of yet another embodiment of a cookware lid having a handle that is movable between first and second configurations.
Figure 7B:
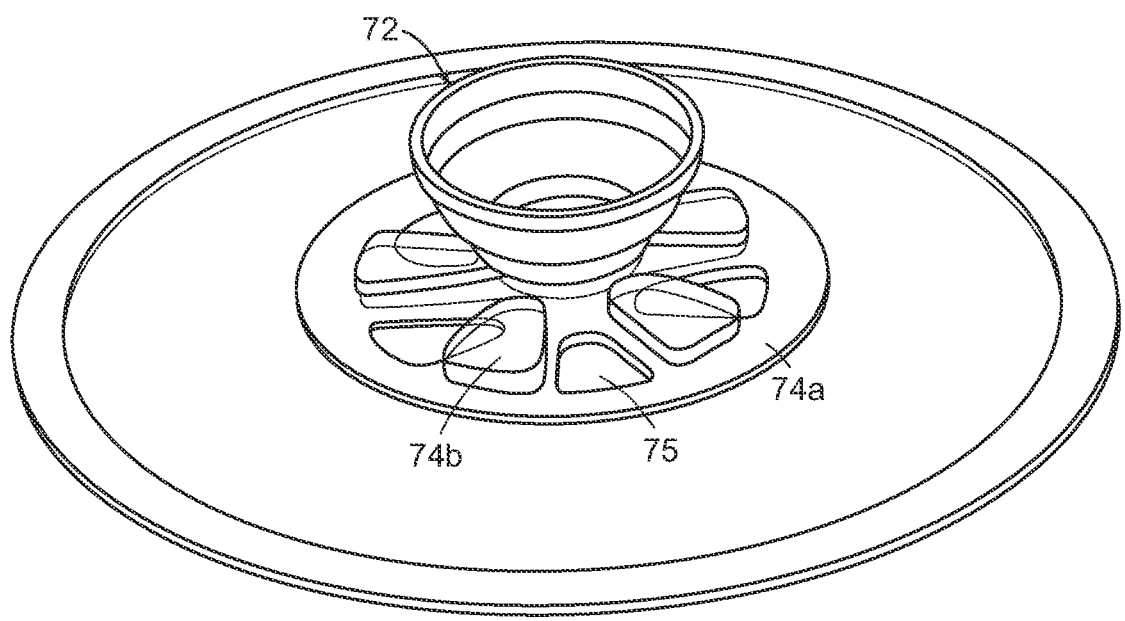
FIG. 7B is a top perspective view of the cookware lid of FIG. 7A.

FIG. 7A is a cross-sectional side view of yet another embodiment of a cookware lid assembly 70 having a collapsible handle 72 that is movable between first and second configurations. In this embodiment, the handle 72 has an open top surface. In such a configuration, a first attachment member can be exposed, similar to that described above with respect to FIGS. 3A-3C. The cookware lid assembly 70 also includes a venting structure 74 positioned on the lower surface of the lid, opposite the handle. The venting structure 74 can include a first guard 74a and a second guard 74b. The first guard 74a and second guard 74b can be fixed relative to one another to create one or more apertures 75. Alternatively, the first guard 74a and second guard 74b can be rotatably movable relative to each other in order to adjust the size or number of apertures 75 for venting hot air or steam from a cooking chamber. The lid can include a central opening to allow for air flow through the venting structure. In other aspects, at least one vent may be provided within the handle, allowing steam to exit the lid and pass through the open top surface of the handle.

The venting structure 74 can also include an attachment member on the bottom surface of the lid 70 to mate with a first attachment structure associated with the collapsible handle 72 of an adjacent lid. In another embodiment, the vent can include a protrusion that extends within the handle 72. In such an embodiment, the vent may be configured as the first attachment member, and it can be exposed when the handle is in the second configuration.

It is understood that while the first attachment feature has been described as being associated with a collapsible handle, and the second attachment feature has been described as being associated with a bottom surface of cookware lid, these descriptions may be reversed without changing the scope of the invention.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system, comprising:
   a pot or a pan having an open top end;
   a lid having a top surface and a bottom surface, the lid received within the open top end of the pot or the pan; and
   a handle fixedly attached to the lid, the handle having a top portion and a bottom portion, the top portion including a top surface, the handle having a frustoconical shape tapering radially inward from the top surface to the bottom portion and being movable between a first extended configuration in which the top portion of the handle is spaced from the top surface of the lid, and a second collapsed configuration in which the top portion is adjacent the top surface of the lid and covers the bottom portion.

2. The cooking system of claim 1, further comprising a first attachment feature on the handle, the first attachment feature being exposed when the handle is in the second collapsed configuration.

3. The cooking system of claim 2, further comprising a second attachment feature on the bottom surface of the lid.

4. The cooking system of claim 1, wherein the handle is flexible and is configured to deform when moved between the first and second configurations.

5. A cooking system, comprising:
   a first lid having a bottom surface and a top surface having a first handle thereon, the first handle being movable between a first configuration and a second configuration, and the first lid including a first attachment feature; and
   a second lid having a second handle on a top surface thereof, the second handle being movable between a first configuration and a second configuration, and the second handle including a second attachment feature, wherein the first attachment feature is configured to abut the second attachment feature when the second handle is in the second configuration to allow a top surface of the second handle to contact the bottom surface of the first lid when the first lid is stacked on top of the second lid.

6. The cooking system of claim 5, wherein the first attachment feature is on the bottom surface of the first lid.

7. The cooking system of claim 6, wherein the first attachment feature comprises a protrusion on the bottom surface of the first lid.

8. The cook system of claim 5, wherein the first attachment feature is configured to receive the second attachment feature therein.

9. The cooking system of claim 5, wherein the first and second handles each have a height in the first configuration that is greater than a height in the second configuration.

10. A cooking system, comprising:
a pot or a pan having an open top end;
a body received within the open top end of the pot or the pan, the body having a top surface, a bottom surface, and an outer periphery with a rim extending therearound, the rim having an edge extending below the bottom surface; and
a handle attached to the body, the handle having a plurality of flexible annular portions configured to collapse and extend the handle relative to the top surface of the body, the handle movable between a first configuration having a height greater than a height of the edge, and a second configuration having a height equal to or less than the height of the edge.

11. The cooking system of claim 10, further comprising a first attachment feature, wherein the first attachment feature is exposed when the handle is in the second configuration.

12. The cooking system of claim 11, further comprising a second attachment feature on said bottom surface of the lid.

13. The cooking system of claim 11, wherein the first attachment feature is formed from a portion of the handle in the second configuration.

\* \* \* \* \*